(12) United States Patent
Gigliotti, Jr. et al.

(10) Patent No.: US 7,300,708 B2
(45) Date of Patent: Nov. 27, 2007

(54) EROSION AND WEAR RESISTANT PROTECTIVE STRUCTURES FOR TURBINE ENGINE COMPONENTS

(75) Inventors: Michael Francis Xavier Gigliotti, Jr., Scotia, NY (US); Canan Uslu Hardwicke, Niskayuna, NY (US); Liang Jiang, Guilderland, NY (US); John William Short, Niskayuna, NY (US); Don Mark Lipkin, Nishayuna, NY (US); Jonathan Paul Blank, Mason, OH (US); Krishnamurthy Anand, Bangalore (IN)

(73) Assignee: General Electric Company, Niskayuna, NY (US)

( * ) Notice: Subject to any disclaimer, the term of this patent is extended or adjusted under 35 U.S.C. 154(b) by 183 days.

(21) Appl. No.: 10/801,843

(22) Filed: Mar. 16, 2004

(65) Prior Publication Data

US 2005/0207896 A1   Sep. 22, 2005

(51) Int. Cl.
*B32B 15/04* (2006.01)
*B32B 18/00* (2006.01)

(52) U.S. Cl. ............ 428/632; 420/902; 428/615; 428/680; 428/660; 416/241 B

(58) Field of Classification Search ........ 428/615, 428/632, 680; 420/902; 416/241 B
See application file for complete search history.

(56) References Cited

U.S. PATENT DOCUMENTS

| | | | |
|---|---|---|---|
| 4,380,574 A * | 4/1983 | Gessinger et al. ......... | 428/686 |
| 4,832,993 A * | 5/1989 | Coulon .................... | 427/596 |
| 4,839,245 A * | 6/1989 | Sue et al. .................. | 428/698 |
| 5,448,828 A | 9/1995 | Willems et al. | |
| 5,531,369 A | 7/1996 | Richman et al. | |
| 5,956,845 A | 9/1999 | Arnold | |
| 6,127,044 A | 10/2000 | Yamamoto et al. | |

(Continued)

FOREIGN PATENT DOCUMENTS

DE   2551895   5/1976

(Continued)

OTHER PUBLICATIONS

Minoru Umemoto, "Nanocrystallization of Steels by Various Severe Plastic Deformation" Department of Production Systems Engineering, Toyohashi University of Technology, Toyohashi, Aichi 441-8580, Japan (Written in Jun. 2003), 10 pages.

(Continued)

*Primary Examiner*—John J. Zimmerman
*Assistant Examiner*—Aaron Austin
(74) *Attorney, Agent, or Firm*—Ann M. Agosti; Patrick K. Patnode

(57) ABSTRACT

An erosion resistant protective structure for a turbine engine component comprises a shape memory alloy. The shape memory alloy includes nickel-titanium based alloys, indium-titanium based alloys, nickel-aluminum based alloys, nickel-gallium based alloys, copper based alloys, gold-cadmium based alloys, iron-platinum based alloys, iron-palladium based alloys, silver-cadmium based alloys, indium-cadmium based alloys, manganese-copper based alloys, ruthenium-niobium based alloys, ruthenium-tantalum based alloys, titanium based alloys, iron-based alloys, or combinations comprising at least one of the foregoing alloys. Also, disclosed herein are methods for forming the shape memory alloy onto turbine component.

25 Claims, 7 Drawing Sheets

U.S. PATENT DOCUMENTS

| | | |
|---|---|---|
| 6,451,454 B1 | 9/2002 | Hasz et al. |
| 6,458,317 B1 | 10/2002 | Koskinen et al. |
| 6,607,693 B1 | 8/2003 | Saito et al. |
| 7,093,423 B2 * | 8/2006 | Gowda et al. ............... 60/204 |
| 2001/0021346 A1 | 9/2001 | Doi et al. |
| 2003/0194320 A1 | 10/2003 | Villhard |
| 2006/0068214 A1 | 3/2006 | Gigliotti et al. |

FOREIGN PATENT DOCUMENTS

| | | |
|---|---|---|
| EP | 0 508 414 B1 | 7/1996 |
| EP | 0 515 078 B1 | 12/1997 |
| EP | 0 642 876 B1 | 3/2000 |
| EP | 1054077 | 11/2000 |
| EP | 1054077 A2 * | 11/2000 |
| JP | 03036230 | 2/1991 |
| JP | 03150331 | 6/1991 |
| WO | WO-99/66102 * | 12/1999 |
| WO | WO 99/66102 | 12/1999 |
| WO | WO-99/66102 A1 * | 12/1999 |

OTHER PUBLICATIONS http://www.wilkinsonsteel.com/Stainless/316.htm (Dec. 19, 2003) 2 pages.

T. Saito et al. "Multifunclional Alloys Obtained Via A Disclocation-Free Plastic Deformation Mechanism" Science, vol. 300 464-467 (Apr. 18, 2003).

U.S. Appl. No. 10/955,056, filed Sep. 30, 2004, Gigliotti, Jr. et al., Erosion And Wear Resistant Protective Structures For Turbine Components (available in IFW).

EPO Search Report dated Jun. 13, 2005.

* cited by examiner

Erosion Damage

Leading Edge View

△ Stellite 6B
● GTD450
○ M152
□ Ti- Base Alloy

Average Erosion Depth
@ 10 min, 750ft/sec

Ti-Base Alloy

~ 16 mil

NiTiCr

~ 5 mil

EROSION AND WEAR RESISTANT PROTECTIVE STRUCTURES FOR TURBINE ENGINE COMPONENTS

BACKGROUND

The present disclosure generally relates to erosion and wear resistant protective structures in the forms of coatings or shields for turbine engine components, and more particularly, to shape memory alloy protective structures for providing erosion resistance for turbine engine components.

Erosion and wear resistant protective structures in the forms of coatings and shields have found various applications in turbine engines. For example, abrasive, wear-resistant coatings are frequently deposited on the outer tips of turbine blades. Such coatings are generally employed to decrease the rate of wear/erosion of the blade due to contact of the blade with its surrounding shroud. Other wear resistant coatings are placed on leading edges of turbine blades to decrease wear (by erosion) due to contact with environmental particulates (e.g., dirt, sand, and the like) that enter the turbine engine during operation. Still another type of wear coating is placed on parts of the turbine engine that are susceptible to wear due to part-to-part contact during operation. For example, in the high-pressure turbine (HPT) and low-pressure turbine (LPT) sections of an engine, wear coatings are placed on nozzle wear pads that rub against an adjacent structure, such as a shroud hanger or a pressure balance seal.

In addition to abrasive and frictional wear, erosion resistant protective structures in the form of coatings and shields have been formed on turbine components that exhibit distress from water or other types of liquid droplet erosion. As it is also well known in the art of steam turbines, there is a tendency for water droplets to form in the steam flowing through the lowest pressure portions of low-pressure steam turbines. The droplets can deposit on the stationary buckets, i.e., nozzles, where they coalesce into films or rivulets and slowly move to the trailing edge of the nozzle. Eventually, the films and/or rivulets are removed from the stationary bucket by the steam flow in the form of large drops. These large drops impact the later stages of rotating buckets at a speed approximately equal to the circumferential velocity of the rotating buckets. The impact of water drops generates an impulsive contact pressure on the blade material surface causing progressive loss of bucket material, i.e., erosion. The resulting erosion of the steam turbine engine components can cause power loss, can effect turbine efficiency, and bucket lifetime, among others.

Typically, the blades in the last few rows of blades in a low-pressure steam turbine are formed by forging a ferrous alloy containing a relatively high chromium content. One such alloy contains approximately 15.5 to 17.5% chromium and 3.0 to 5.0% nickel. Another alloy contains 11.5 to 13.0% chromium. Still other protective structures in the forms of coatings and shields are formed of cobalt based alloys such as those commercially available under the trademark Stellite® from the Deloro Stellite Company. Although these protective structures provide better erosion resistance than base metal, their erosion resistance is not optimum, still resulting in large non-recoverable efficiency loss. In addition, the affixment of protective structures onto a turbine blade also results in reliability problems, such as stress corrosion cracking as well as manufacturing defects in the forms of voids or cracks of the integrated blade structure.

Accordingly, a continuing need exists in the art for improved erosion and wear resistant protective structures.

BRIEF SUMMARY

Disclosed herein is a turbine engine component comprised of a substrate; and an erosion resistant protective structure formed on the substrate, the erosion resistant protective structure comprising a shape memory alloy. The shape memory alloy comprises nickel-titanium based alloys, indium-titanium based alloys, nickel-aluminum based alloys, nickel-gallium based alloys, copper based alloys, gold-cadmium based alloys, iron-platinum based alloys, iron-palladium based alloys, silver-cadmium based alloys, indium-cadmium based alloys, manganese-copper based alloys, ruthenium-niobium based alloys, ruthenium-tantalum based alloys, titanium based alloys, iron-based alloys, or combinations comprising at least one of the foregoing alloys.

In another embodiment, a turbine engine component comprises a substrate; a diffusion-controlling layer affixed to the substrate; and an erosion resistant protective structure affixed to the diffusion layer, wherein the erosion resistant protective structure comprises a shape memory alloy.

A process for providing an erosion resistant protective structure to a turbine component comprises affixing a diffusion-controlling layer on a region of the turbine component to be protected with the erosion resistant protective structure, wherein the diffusion-controlling layer is selected from a group consisting of pure metals or alloys that do not form brittle and/or low melting phase due to interaction with erosion resistant structure and/or substrate; and affixing a shape memory alloy on the diffusion-controlling layer, wherein affixing the diffusion-controlling layer, and the shape memory alloy comprises a hot isostatic pressing process at a temperature less than about 950° C. and a pressure greater than about 20 ksi.

In another embodiment, a process for providing an erosion resistant protective structure to a turbine component comprises affixing a diffusion-controlling layer on a region of the turbine component to be protected with the erosion resistant protective structure, wherein the diffusion-controlling layer is selected from a group consisting of pure metals or alloys that do not form brittle and/or low melting phase due to interaction with erosion resistant structure and/or substrate; and affixing a shape memory alloy on the diffusion-controlling layer, wherein affixing the diffusion-controlling layer, and the shape memory alloy comprises co-extruding at a temperature less than about 950° C. and an area reduction equal to or greater than 2:1.

In yet another embodiment, a process for providing an erosion resistant protective structure to a turbine component comprises affixing a diffusion-controlling layer on a region of the turbine component to be protected with the erosion resistant protective structure, wherein the diffusion-controlling layer is selected from a group consisting of pure metals or alloys that do not form brittle and/or low melting phase due to interaction with erosion resistant structure and/or substrate; and affixing a shape memory alloy on the diffusion-controlling layer, wherein affixing the diffusion-controlling layer, and the shape memory alloy comprises a process selected from the group consisting of brazing, welding, thermally spraying, laser consolidation, plasma transfer arc, hot rolling, cold rolling, ion plasma deposition, forging, explosion welding, fusion welding, friction stir welding, and cladding.

An insert for repairing a turbine component comprises a substrate dimensioned to be inserted into a recess formed in a turbine component; and an erosion resistant protective structure formed on a surface of the substrate, the erosion resistant protective structure comprising a shape memory alloy.

The above described and other features are exemplified by the following Figures and detailed description.

DETAILED DESCRIPTION

Disclosed herein are protective structures in the forms of coatings or shields for surfaces of turbine engine components prone to particle and/or water erosion. The coatings generally comprise a shape memory alloy and provide erosion and/or wear resistance. As used herein, the terms "erosion resistant" and "wear resistant" are interchangeable and are intended to infer the same phenomena, i.e., a reduction in the loss of base material, such as a turbine component, upon impact with particulate matter and/or liquid. As such, the shape memory alloy protective structure can be selectively formed on those regions of the turbine engine component prone to erosion and wear or may be disposed on all surfaces of the component or substrate. For example, the shape memory alloy protective structure can be formed on the turbine nozzle, shroud, shroud hanger, stationary bucket, airfoil, fan blades, pressure balance seal, combustor component, and the like. It has been found that the shape memory alloy protective structure advantageously absorbs stress waves related to liquid and/or particulate impact and unlike other prior art coatings, resists high cycle fatigue.

Turbine engine components are generally formed of a high-temperature alloy and/or superalloys and are known for high temperature performance in terms of tensile strength, creep resistance, oxidation resistance, and corrosion resistance, for example, nickel-based alloys, cobalt-based alloy, titanium-based alloys and so forth. Other high temperature alloys may also be treated according to the various embodiments of the present disclosure, such as ferritic-based alloys used in lower temperature environments, including the low-pressure stage of a steam turbine engine, e.g., 12-Cr steel. The shape memory alloy protective structure is metallurgically bonded to the surface of the turbine component to minimize liquid and/or particulate erosion and wear.

In the case of a turbine component formed of a superalloy material, the superalloy is typically a nickel-based or a cobalt-based alloy, wherein the amount of nickel or cobalt in the superalloy is the single greatest element by weight. Illustrative nickel-based superalloys include at least about 40 weight percent (wt %) nickel (Ni), and at least one component from the group consisting of cobalt (Co), chromium (Cr), aluminum (Al), tungsten (W), molybdenum (Mo), titanium (Ti), and iron (Fe). Examples of nickel-based superalloys are designated by the trade names Inconel®, Nimonic®, Rene® (e.g., Rene®80-, Rene®95, Rene®142, and Rene®N5 alloys), and Udimet®, and include directionally solidified and single crystal superalloys. Illustrative cobalt-base superalloys include at least about 30 wt % Co, and at least one component from the group consisting of nickel, chromium, aluminum, tungsten, molybdenum, titanium, and iron. Examples of cobalt-based superalloys are designated by the trade names Haynes®, Nozzaloy®, Stellite® and Ultimet®.

Figure 1:
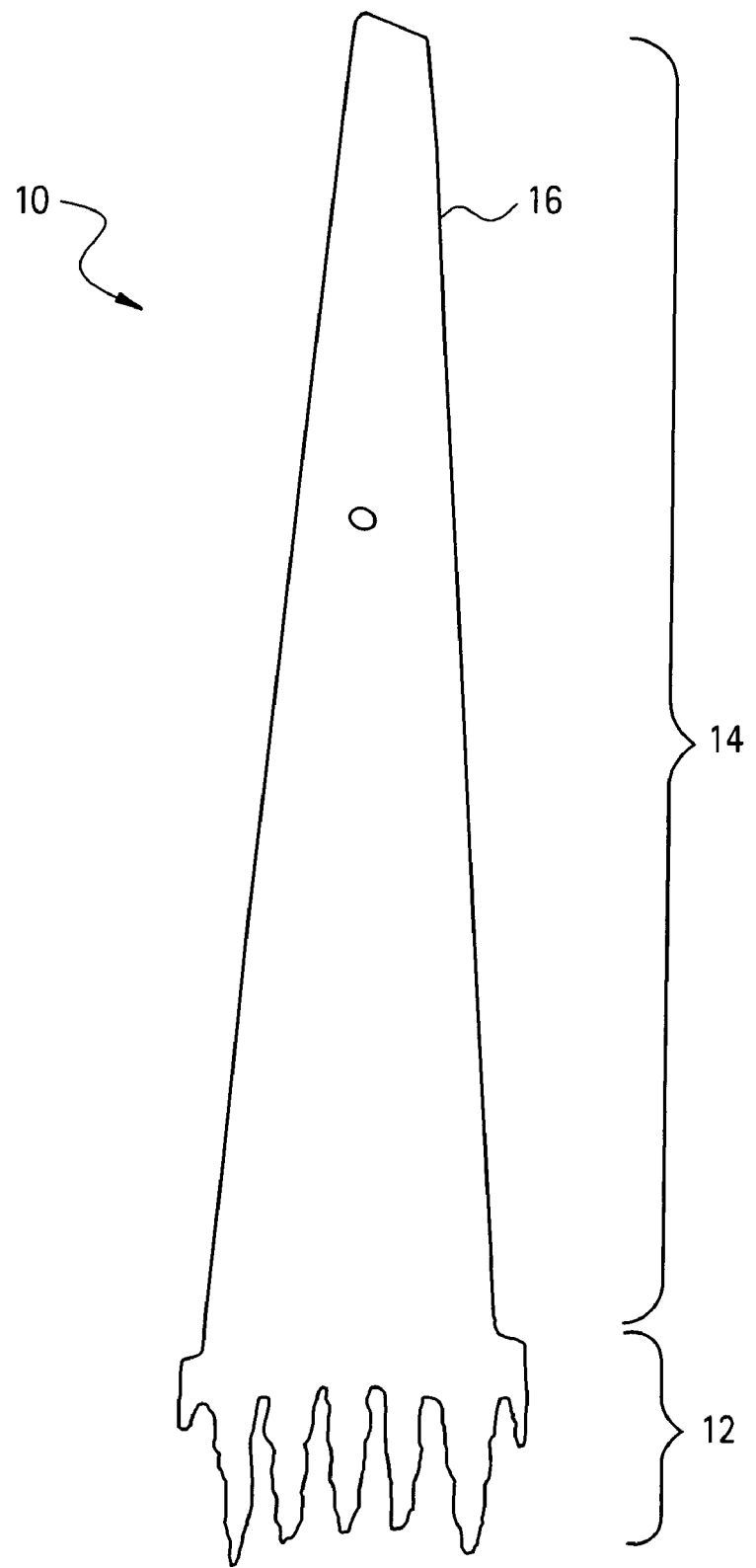
FIG. 1 is a perspective view of a steam turbine bucket.
Figure 2:
FIG. 2 pictorially illustrates a prior art stream turbine bucket showing the effects of water erosion during operation.

FIG. 1 illustrates, in perspective, an exemplary turbine component that can be treated with the erosion resistant protective structures of the present disclosure. It is noted that the operating principles and general structure of turbine engines are well known in the art and are not repeated herein. As illustrated, the exemplary turbine component is a steam turbine bucket 10 of the type commonly employed at a final stage of a low-pressure turbine for a steam turbine. The bucket 10 generally includes a dovetail portion 12 and a blade portion 14. The dovetail portion is mounted to a rotational shaft (not shown) by means of pins or the like. While the drawing depicts a single blade, the engine typically has a plurality of blades mounted on the rotational shaft. The blades rotate within an area defined by a shroud, which is generally supported by a shroud hanger. The shape memory alloy protective structure can be applied on any one of or any combination of the nozzle, the blade, the shroud, and the shroud hanger. In one embodiment, the erosion resistant protective structure is formed on those regions of the turbine component prone to liquid erosion, e.g., regions subject to impaction of water droplets during operation, and the like. In a preferred embodiment, the shape memory alloy is preferably applied at about a leading edge 16 of the blade portion 14. It has been found that the leading edge 16 is most susceptible to liquid erosion. FIG. 2 pictorially illustrates a leading edge of a prior art bucket exhibiting the deleterious effects caused by water erosion during operation thereof. The bucket does not include the shape memory alloy protective structure.

Advantageously, applying a shape memory alloy protective structure onto the turbine component surface provides resistance to liquid and particulate erosion. For example, during operation of the turbine engine, particles and/or liquid droplets impact surfaces of the various components that form the turbine engine and normally would erode the surface. By affixing these surfaces with the shape memory alloy protective structure, the deformation caused by the impacting particles and/or liquid droplets is absorbed by the protective structure, thereby minimizing erosion and/or wear. The deformation caused by the impacting particles or liquid droplets can then be removed by altering the transformation phase of the shape memory alloy so as to restore the surface to its original shape, i.e., without deformation. While not wanting to be bound by theory, it is believed that the superelastic properties, among others, of the shape memory alloys provide erosion and wear resistant properties caused by impact of the particulates and/or liquid.

Shape memory alloys typically exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. In one embodiment, the shape memory alloy comprises a composition selected to exhibit a martensitic phase at an environmental temperature in which the turbine engine component is disposed or operated. In another embodiment, the shape memory alloy comprises a composition selected to exhibit an austenite phase at an environmental temperature in which the turbine engine component is disposed or operates and a martensite phase at about a temperature lower than the environmental temperature or operating temperature. In this embodiment, when the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which martensite finishes transforming to the martensite phase is called the martensite finish temperature ($M_f$). Generally, the shape memory alloys are soft and easily deformable in their martensitic phase and are hard, stiff, and/or rigid in the austenitic phase.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature (below $M_f$) deformation of the shape memory material will induce the martensite to austenite type transition, and the material will recover the original, high-temperature (above $A_f$) shape. Hence, one-way shape memory effects are only observed upon heating.

Intrinsic and extrinsic two-way shape memory materials are characterized by a shape transition both upon heating from the martensite phase to the austenite phase, as well as an additional shape transition upon cooling from the austenite phase back to the martensite phase. Shape memory alloy protective structures that exhibit an intrinsic shape memory effect are fabricated from a shape memory alloy composition that will automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, protective structures that exhibit the extrinsic two-way shape memory effects are composite or multi-component materials that combine a shape memory alloy composition that exhibits a one-way effect with another element that provides a restoring force to reform the protective structure.

As previously discussed, shape memory alloys can exhibit superelastic behavior. In one embodiment, the shape memory alloy comprises a composition selected to exhibit a superelastic phase at an environmental temperature in which the turbine engine component is disposed or operates and a martensite phase at about a temperature lower than the environmental temperature or operating temperature. Superelastic behavior results if the shape memory alloy is deformed at a temperature that is slightly above its transformation temperature, $A_s$, with a stress/strain level not above its recoverable range. The superelastic effect is caused by a stress-induced formation of some martensite above its normal temperature, $M_s$. Because it has been formed above its normal temperature, the martensite reverts immediately to an undeformed austenite as soon as the stress is removed. As such, the shape memory alloy coating can provide a very springy, "rubberlike" elasticity so as to absorb the impact of particulate matter and liquid.

In addition to the above noted non-linear elastic properties, superelastic shape memory alloys can be strained several times more than ordinary metal alloys without being plastically deformed, which reflect its rubber-like behavior. It is, however, only observed over a specific temperature range. The highest temperature at which martensite can no longer stress induced is generally called $M_d$. Above $M_d$, shape memory alloys are deformed and hardened like ordinary materials by dislocation multiplication or slipping. Below $A_s$, the material is martensitic and does not recover. Thus, superelasticity appears in a temperature range from near $A_f$ and up to $M_d$. The largest ability to recover occurs close to $A_f$.

Figure 3:
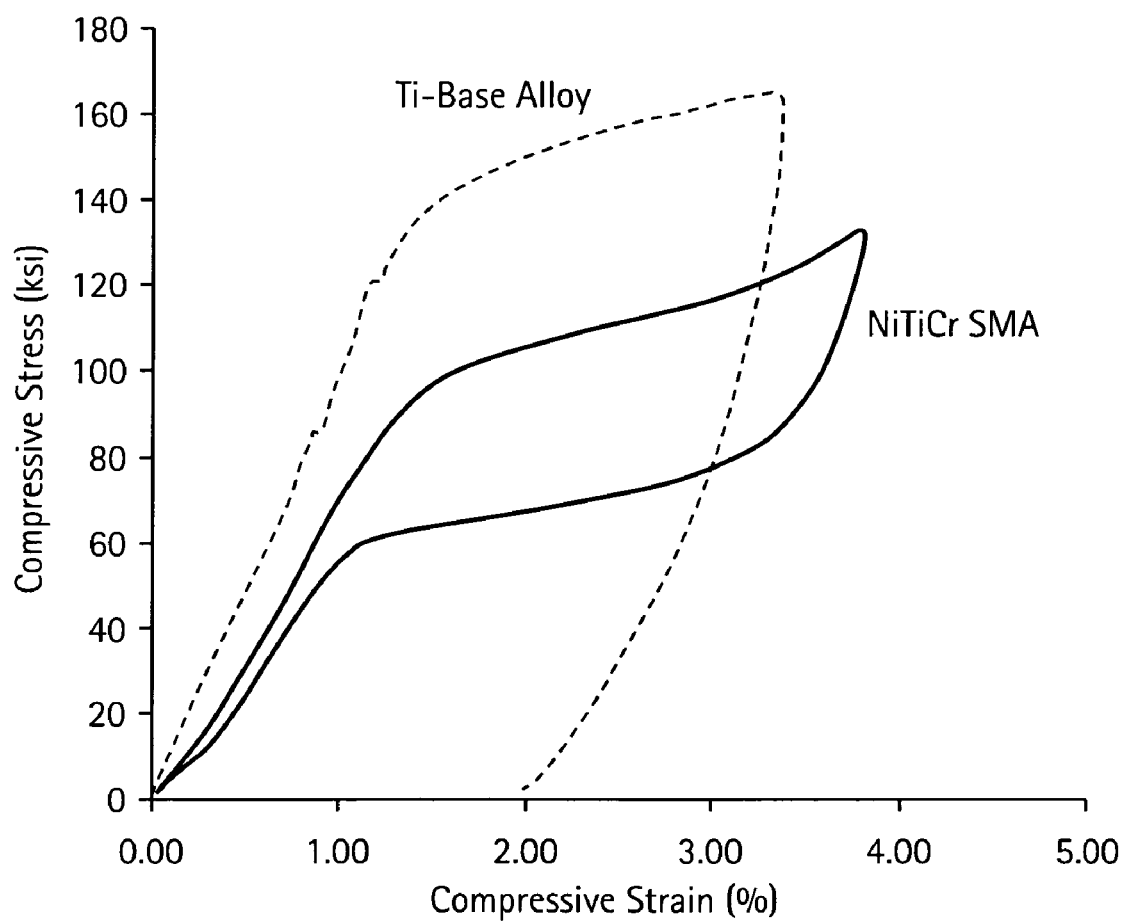
FIG. 3 graphically illustrates compressive stress as a function of compressive strain for a NiTiCr shape memory alloy and a Ti-based alloy.

It has been found that about 8% strain can be recovered by unloading and heating. Strain above the limiting value will remain as a permanent plastic deformation. The operating temperature for shape memory devices must not move significantly away from this transformation range, or else the shape memory characteristics may be altered. FIG. 3 graphically illustrates compressive stress as a function of compressive strain for a turbine component formed of a Ti-based alloy relative to a NiTiCr shape memory alloy. The NiTiCr shape memory alloy comprised 56 wt % Ni, 43 wt % Ti, and 1 wt % Cr. Here, it can be seen that the shape memory alloy provides greater energy absorption and superelasticity properties relative to the Ti-based alloy, which has been found to directly translate into improved erosion resistance relative to the base material. It is believed that the shape memory alloy absorbs the stress wave associated with the impacting particles or liquid droplets and, as shown, inherently resists erosion damage due to its superelasticity.

Martensitic shape memory alloys inherently have good damping capability due to the internal friction of twin boundaries. In addition, at a strain/stress level where shape memory effect exists, the martensitic materials show a much smaller work hardening effect beyond its yielding point as comparing to its austenitic counterpart or a typical metallic material. Those effects also can advantageously provide martensitic shape memory alloy with good erosion resistance.

Suitable shape memory alloy materials for providing erosion resistance to surfaces of turbine components include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, ruthenium-niobium based alloys, ruthenium-tantalum based alloys, titanium based alloys, iron-based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like upon heating or cooling through phase transition temperatures or upon stress or strain induced phase transition. A preferred shape memory alloy is a nickel-titanium based alloy commercially available under the trademark NITINOL from Shape Memory Applications, Inc. Selection of a suitable shape memory alloy composition depends on the temperature range where the component will operate.

The term "shape memory alloy" is also intended to include shape memory alloy composites, wherein the shape memory alloy based composites comprises a matrix of shape memory alloy and at least one hard particulate phase. The hard particulate phase comprises borides, oxides, nitrides, carbides, or combinations comprising at least one of the foregoing particulates. Alternatively, the shape memory alloy composites comprises a multilayer structure of the shape memory alloy alternating with a metallic or a ceramic layer with the same or different thickness as the shape memory alloy layer. The ceramic layer is preferably selected from the group consisting of borides, oxides, nitrides, carbides, TiN, $Y_2O_3$, and TaC. The metallic layer is preferably selected from the group consisting of Ti, Ni, Co, Ti-based alloys, Ni-based alloys, Co-based alloys, Fe-based alloys, and the like. In yet another alternative embodiment, the composite may further include ultra-fine grained materials such as may be produced by severe plastic deformation processes generally known by those skilled in the art. For example, suitable severe plastic deformation processes for obtaining the desired grains sizes include, but are not intended to be limited to, ball milling, impact deformation, shot peening, high pressure torsion processing, and the like. Preferred grain sizes are less than 2 micrometers, with grain sizes less than 1 micrometer more preferred, and with grain sizes less 100 nanometers even more preferred. Suitable ultra-fine grained materials are characterized by high hardness, no recrystallization, slow grain growth upon annealing, and low dislocation density interior of grains. While not wanting to be bound by theory, it is believed that the ultra-fine grained materials in the composite will prevent and/or deflect propagation of cracks within the coating.

The shape memory alloy can be affixed to the turbine component by means of metallurgical bonding. The specific method of metallurgical bonding will depend on shape memory alloy composition, the alloy composition of the turbine component, as well as other parameters. Suitable methods include, but are not intended to be limited to, brazing, extrusion, explosion bonding, hot-isotactic-pressing (HIP), cladding, laser processes, plasma transfer arc processes, ion plasma deposition, forging, fusion welding, vacuum plasma spraying, thermally spraying, friction-stir welding, and the like. Optionally, the shape memory alloy protective structure can be formed into an insert and/or coupon, which can then be attached to the turbine component.

The alloying elements and compositions of the shape memory alloys are chosen based on the desired superelastic behavior and transformation temperatures. In a preferred embodiment, the process selected for forming the metallurgical bond provides minimal interdiffusion between the substrate alloy and the shape memory alloys. It has been found that interdiffusion can lead to brittle Ti and Fe intermetallic compounds that can weaken the so-formed bond between the two materials.

To promote mechanical strength, resistance to wear, and resistance to erosion, an optional diffusion-controlling layer may be affixed prior to affixing the shape memory alloy protective structure. The diffusion-controlling layer is characterized by a high solubility for Ti and Ni/Fe without limited formation of brittle intermetallic compound, and/or with an absence for forming low melting phases with Ti or Ni or Fe. The diffusion-controlling layer is especially preferred when the surface to be affixed is formed of a titanium alloy. It has been found that some shape memory alloy protective structures form undesirable phases at the interface between the base material and the shape memory alloy. The use of the diffusion-controlling layer substantially prevents interdiffusion and formation of undesirable phases.

Preferably, the diffusion-controlling layer is a pure metal or a metal alloy that enhances the metallurgical bonding properties of the shape memory alloy to the turbine component. Suitable metals are selected from a group consisting of pure metals or alloys that do not form brittle and/or low melting phase due to interaction with erosion resistant structure and/or substrate. Suitable metals include, but are not intended to be limited to, Nb, Hf, Ta, and Zr. In this manner, the shape memory alloy is isolated from direct contact with the base material, e.g., titanium alloys, ferrous alloys, and the like. As a result, a wider range of shape memory materials can be employed. The thickness of the diffusion-controlling layer is selected to substantially prevent interdiffusion of the shape memory alloy with the turbine component alloy composition. Preferred thicknesses are about 0.5 mil to about 100 mil, and with about 1 mil to about 5 mil more preferred.

Reference will now be made to exemplary processes for affixing the shape memory alloy onto the turbine component. The various methods generally include coating, bonding, or fixedly joining the shape memory alloy to the base material or the diffusion-controlling layer. For example, the shape memory alloy can be affixed to the turbine component by a diffusion bonding process such as a hot-isotactic pressing (HIP) process. An exemplary HIP process for affixing a NiTi based alloy to a turbine component formed from steel or a titanium based alloy employs a temperature preferably less than 950° C. and a pressure greater than 20 ksi. More preferably, the HIP process employs a temperature of about 700° C. to about 900° C. and a pressure of 20 ksi to about 40 ksi.

In an exemplary co-extrusion process, the preferred temperature and the area reduction ratios are preferably at a temperature less than 950° C. and an area reduction equal to or greater than 2:1. More preferably, the extrusion process employs a temperature of about 700° C. to about 900° C. with the area reduction ratio of 2:1 to 8:1.

Alternatively, a vapor grown shape memory alloy coating can be deposited directly from a gas phase onto a surface of the turbine engine component to form an integral coating.

The thickness of the shape memory alloy protective structure is chosen to provide resiliency and flexibility to those surfaces prone to erosion by particles and/or liquid. As such, the thickness of the shape memory alloy coating should also be of a thickness effective to provide the desired shape memory effect. Suitable thicknesses are about 0.5 mils to about 2 inches, with about 200 mils to about 1 inch more preferred.

The shape memory alloy protective structure can be imparted by optional surface treatments such as application of high-energy beams from ion or laser sources or other mechanical means such as by shot peening or polishing. Optionally, the shape memory alloy coating is exposed to a heat treatment process or an aging process may be employed. The heat treatment process preferably includes exposing the turbine component to a temperature of about 815° C. to about 1,010° C. for a period of up to about 4 hours. The aging process preferably includes heating the component to about 480° C. to about 815° C. for a period of up to about 12 hours. A combination of the heat treatment process and aging process is also contemplated herein.

Although reference has been made to affixing the shape memory alloy onto the turbine component, with or without a diffusion-controlling layer, it is also noted that an insert can be made with the shape memory alloy. In this manner, repair of the turbine component can be made by fixedly attaching the insert to the turbine component in a conventional manner while advantageously providing an erosion resistant surface to the repaired turbine component.

The disclosure is explained in more detail with reference to the following non-limiting Examples, which are only illustrative, but not limitative.

EXAMPLE 1

Figure 4:
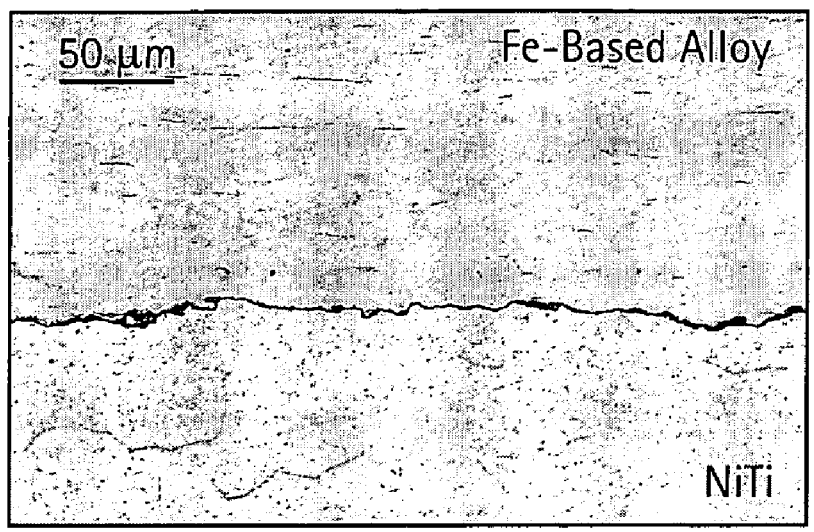
FIG. 4 is an optical micrograph of a nickel titanium shape memory alloy hot isotactic processed to a Fe-based alloy.

In this example, a NiTi shape memory alloy (56 wt % Ni, 44 wt % Ti) was joined to a Fe-based alloy using a HIP device at a temperature of 900° C. and a pressure of about 30 ksi. A cross section of the so-formed joint is illustrated in FIG. 4.

EXAMPLE 2

Figure 5:
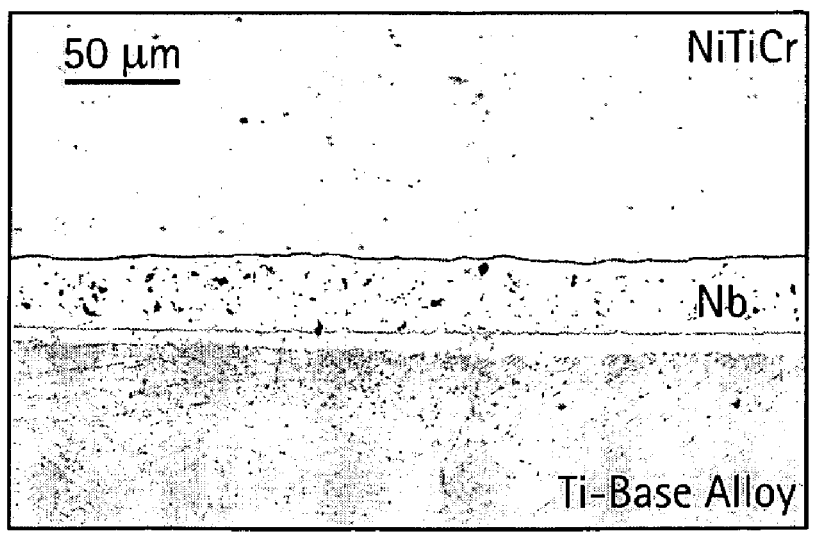
FIG. 5 is an optical micrograph of nickel titanium chromium shape memory alloy hot isotactic processed to a Ti-based alloy with a Nb diffusion-controlling layer.

In this example, the NiTiCr shape memory alloy was joined to the Ti-based alloy with a Nb diffusion-controlling layer sandwiched therebetween. A cross section of the so-formed joint is illustrated in FIG. 5. No cracking is observed by optical and scanning electron microscopy and the joint formed appears to be firmly bonded.

EXAMPLE 3

Figure 6:
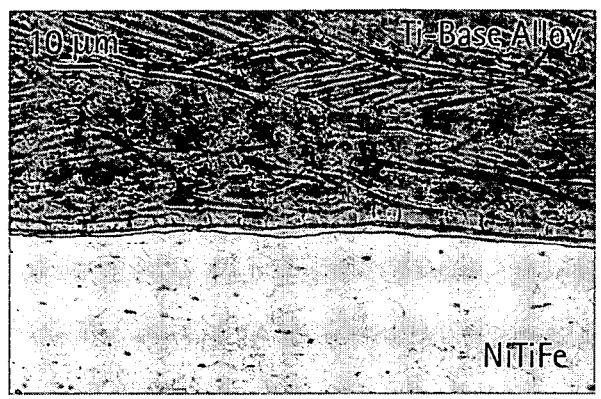
FIG. 6 is an optical micrograph of a nickel titanium iron shape memory alloy extrusion bonded to a Ti-based alloy.

In this example, a NiTiFe alloy (52 wt % Ni, 45 wt % Ti, and 3 wt % Fe) a Nb diffusion-controlling layer, and a Ti-based alloy were co-extruded using the extrusion process at a temperature of 900° C. and an area reduction ratio of 4:1. The NiTi based alloy and Ti-based alloy were preheated for 2 hours at a temperature of 900° C. A cross section of the so-formed joint is illustrated in FIG. 6. The interface between the NiTiFe and Ti-based alloy with the Nb diffusion-controlling layer appears uncracked and firmly bonded.

EXAMPLE 4

Figure 7:
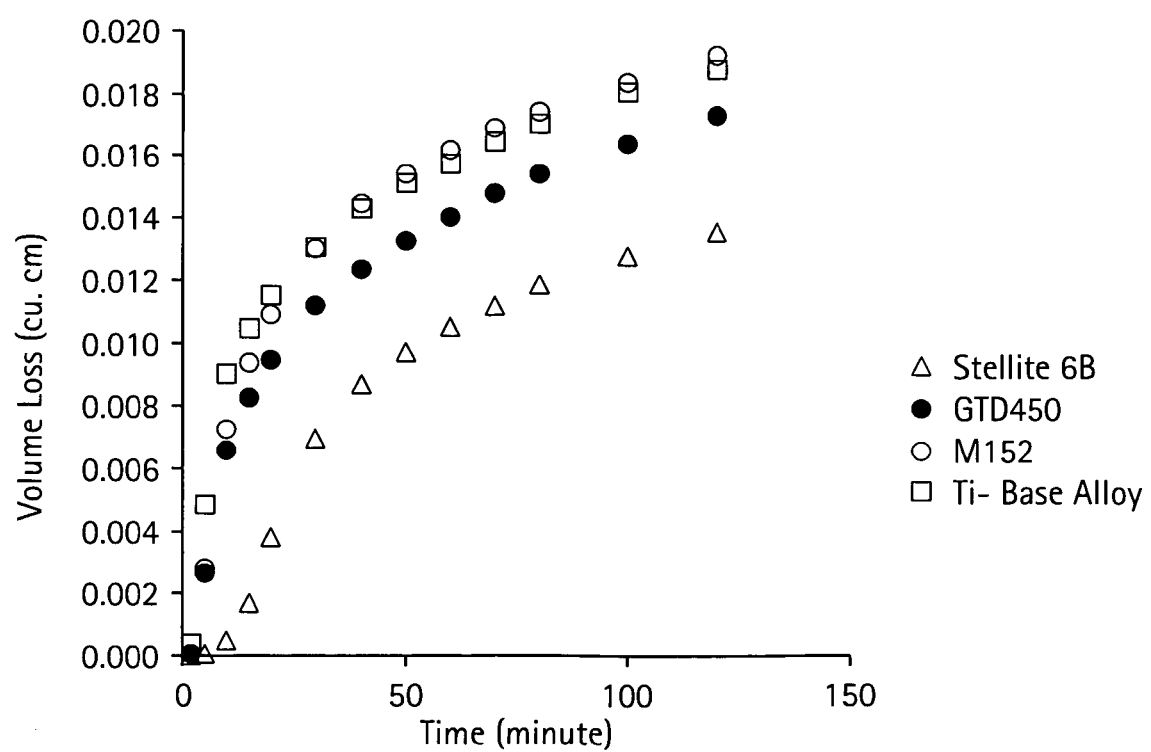
FIG. 7 graphically illustrates erosion testing results for volume loss as a function of time for various conventional bucket materials.
Figure 8:
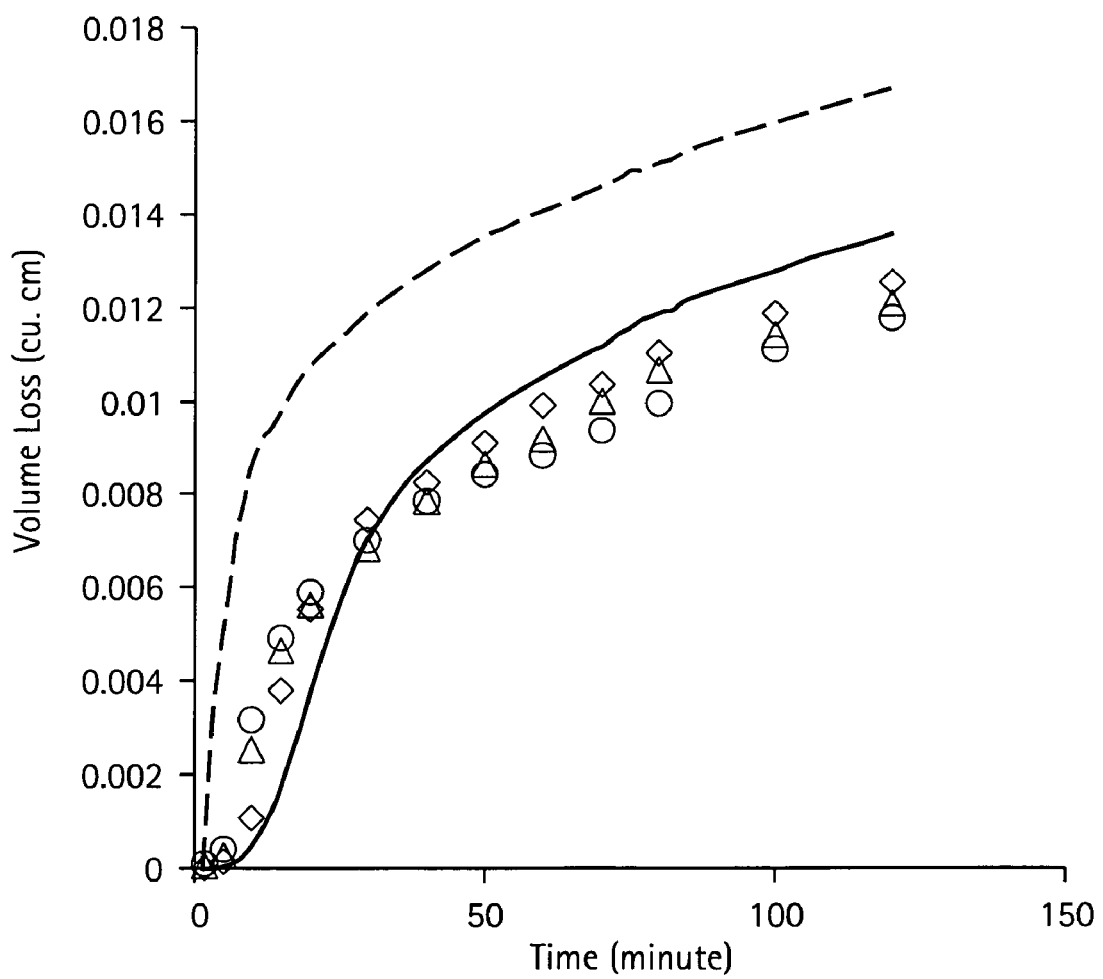
FIG. 8 graphically illustrates erosion testing results for volume loss as a function of time for various shape memory alloys compared to conventional bucket materials.
Figure 9:
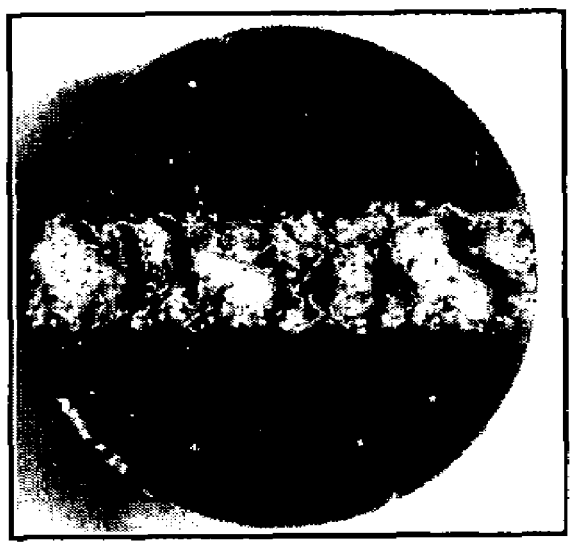
FIG. 9 pictorially illustrates an end-on view of Ti-based alloy and NiTiCr shape memory alloy after exposure to a water erosion test.
Figure 9:
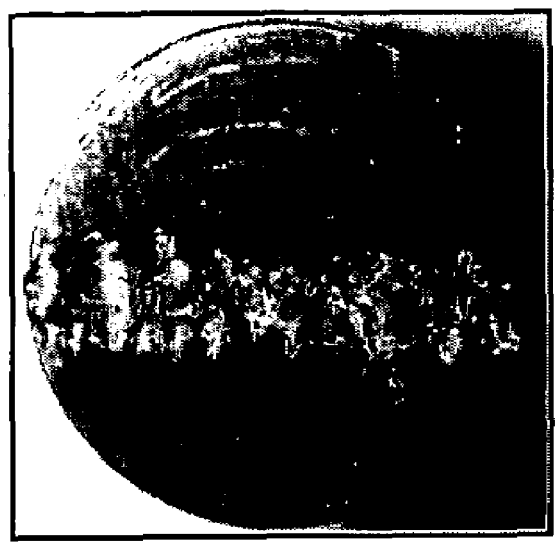

In this example, volume loss as a function of time was measured using a liquid impact erosion test. Test samples were exposed to a water column at room temperature having an impinging velocity of 750 feet per second. The diameter of the water column was 0.032 inches. FIG. 7 graphically illustrates the results for various materials commonly employed for the fabrication of turbine components. FIG. 8 graphically illustrates the results for shape memory alloys compared to Stellite 6B and a Ti-based alloys, two alloys commonly used for fabrication of erosion shields and turbine components, respectively. FIG. 9 pictorially illustrates erosion of a Ti-based alloy compared to NiTiCr alloy after exposure top the water erosion test for 10 minutes. The average erosion depth for the Ti-based alloy was about 16 mils whereas the average erosion depth for the NiTiCr shape memory alloy was about 5 mils. Clearly, it is observed that the use of shape memory alloys on the turbine component alloy provide improved erosion resistance over time relative to the current materials employed for the fabrication of turbine components.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A turbine engine component, comprising:
   a substrate;
   a diffusion-controlling layer affixed to the substrate, wherein the diffusion-controlling layer includes a material selected from the group consisting of Nb, Hf, Ta, and Zr; and
   an erosion resistant protective structure affixed to the diffusion-controlling layer, wherein the erosion resistant protective structure comprises a shape memory alloy, wherein the shape metal alloy comprises a nickel-titanium based alloy, and wherein the diffusion-controlling layer does not form brittle or low melting phases due to interaction with the erosion resistant protective structure or the substrate.

2. The turbine component of claim 1, wherein the substrate is an alloy selected from the group consisting of a nickel based alloy, a cobalt based alloy, a titanium based alloy, and a steel based alloy.

3. The turbine component of claim 1, wherein the shape memory alloy comprises a composition selected to exhibit an austenite phase at an environmental temperature in which the turbine engine component is disposed or operates and a martensite phase at about a temperature lower than the environmental temperature or operating temperature.

4. The turbine component of claim 1, wherein the shape memory alloy comprises a composition selected to exhibit an superelastic phase at an environmental temperature in which the turbine engine component is disposed or operates and a martensite phase at about a temperature lower than the environmental temperature or operating temperature.

5. The turbine engine component of claim 1, wherein the shape memory alloy comprises a composition selected to exhibit a martensitic phase at an environmental temperature in which the turbine engine component is disposed or operated.

6. The turbine component of claim 1, wherein the substrate comprises a turbine nozzle, shroud, shroud hanger, bucket, airfoil, fan blades, pressure balance seal, or a combustor.

7. The turbine component of claim 1, wherein the diffusion-controlling layer is at a thickness effective to prevent interdiffusion of the shape memory alloy or the shape memory alloy composite with the substrate.

8. The turbine engine component of claim 1 wherein the substrate comprises titanium or a titanium based alloy.

9. The turbine engine component of claim 1 wherein the substrate comprises a titanium based alloy, wherein the shape memory alloy comprises at least one of NiTiCr and NiTiFe.

10. The turbine engine component of claim 9 wherein the diffusion controlling layer comprises Nb.

11. The turbine engine component of claim 1, wherein the shape memory alloy is a component of a composite.

12. The turbine engine component of claim 11, wherein the composite further comprises grains having a grain size less than 2 micrometers.

13. The turbine engine component of claim 11, wherein the composite further comprises at least one hard particulate phase.

14. The turbine engine component of claim 13, wherein the at least one hard particulate phase comprises a boride particulate, an oxide particulate, a nitride particulate, a carbide particulate, or combinations comprising at least one of the foregoing particulates.

15. The turbine engine component of claim 11, wherein the composite comprises alternating layers of the shape memory alloy and a metallic or a ceramic layer.

16. The turbine engine component of claim 15, wherein the metallic layer is selected from the group consisting of Ti, Ni, Co, Ti-based alloys, Ni-based alloys, Co-based alloys, and Fe-based alloys.

17. The turbine engine component of claim 15, where in the ceramic layer is selected from the group consisting of borides, oxides, nitrides, carbides, TiN, $Y_2O_3$, and TaC.

18. An insert for repairing a turbine component, comprising:
a substrate dimensioned to be inserted into a recess formed in a turbine component; and
an erosion resistant protective structure formed on a surface of the substrate, the erosion resistant protective structure comprising a shape memory alloy, wherein the shape metal alloy comprises a nickel-titanium based alloy; and
a diffusion-controlling layer intermediate the substrate surface and the shape memory alloy, wherein the diffusion-controlling layer includes a material selected from the group consisting of Nb, Hf, Ta, and Zr and does not form brittle or low melting phases due to interaction with the erosion resistant structure and/or substrate.

19. The insert of claim 18, wherein the shape memory alloy is a component of a composite.

20. The insert of claim 19, wherein the composite further comprises grains having a grain size less than 2 micrometers.

21. The insert of claim 19, wherein the composite further comprises at least one hard particulate phase.

22. The insert of claim 21, wherein the at least one hard particulate phase comprises a boride particulate, an oxide particulate, a nitride particulate, a carbide particulate, or combinations comprising at least one of the foregoing particulates.

23. The insert of claim 19, wherein the composite comprises alternating layers of the shape memory alloy and a metallic or a ceramic layer.

24. The insert of claim 23, wherein the metallic layer is selected from the group consisting of Ti, Ni, Co, Ti-based alloys, Ni-based alloys, Co-based alloys, and Fe-based alloys.

25. The insert of claim 23, wherein the ceramic layer is selected from the group consisting of borides, oxides, nitrides, carbides, TiN, $Y_2O_3$, and TaC.

* * * * *